United States Patent Office 3,111,379
Patented Nov. 19, 1963

3,111,379
MANUFACTURE OF POTASSIUM BICARBONATE
Alan B. Gancy, Princeton, and Michael J. McCarthy, Rahway, N.J., assignors to FMC Corporation, a corporation of Delaware
No Drawing. Filed Apr. 12, 1961, Ser. No. 102,362
2 Claims. (Cl. 23—64)

This invention relates to the production of potassium bicarbonate.

Sodium bicarbonate has been produced classically by reaction of sodium chloride in aqueous solution with ammonium bicarbonate. This method is not applicable to the production of potassium bicarbonate, however, and methods for converting potassium chloride to potassium bicarbonate have been sought.

It is reported in British Patent No. 3,967, of 1878, that potassium bicarbonate can be made by reacting potassium chloride with carbon dioxide and trimethylamine. While this process is operative, it was never used commercially, apparently due to the low yields achieved with it as reported in U.S. Patent No. 2,752,222. U.S. Patent No. 2,752,222 goes on to teach that the basic reaction can be made to produce high yields if primary and secondary amines are substituted for the tertiary amines, trimethylamine. The reaction proceeds as follows:

$$MCl + NH_2R + CO_2 + H_2O \rightarrow MHCO_3 + NH_2R \cdot HCl$$
$$MCl + NHR_2 + CO_2 + H_2O \rightarrow MHCO_3 + NHR_2 \cdot HCl$$

Because of the success selectively achieved with the primary and secondary amines, further developments have revolved around finding more suitable amines, particularly amines in these classes. For example, U.S. Patent No. 2,782,093, issued to G. Hulot et al. on February 19, 1957, teaches that primary and secondary alkyl amines having alkyl radicals containing from 3 to 4 carbon atoms, have been found particularly useful in the process. These amines have the advantage in the preparation of potassium bicarbonate that carbon dioxide has a low equilibrium pressure over their amine bicarbonates, so that the reaction may be conducted at pressures as low as about atmospheric.

Under proper conditions, the reaction to produce potassium bicarbonate from potassium chloride can be conducted efficiently employing these preferred primary and secondary amines. However, their use results in seriously reduced yields at even moderately elevated temperatures, for example, at about 40° C., a temperature often encountered in normal operation.

It is an object of the present invention to provide a method of producing potassium bicarbonate by the reaction of potasisum chloride and carbon dioxide in the presence of a reagent which enters into the reaction as an intermediate, in which the reaction proceeds efficiently at useful elevated temperatures, as well as at room temperature, and at pressures on the order of atmospheric.

It has been determined, quite unexpectedly, that potassium bicarbonate can be produced by reaction of potassium chloride and carbon dioxide in an aqueous system containing the heterocyclic imine, piperidine, by introducing carbon dioxide gas into an agitated aqueous system containing potassium chloride and piperidine to provide the corresponding potassium bicarbonate and piperidine hydrochloride, and separating the bicarbonate product from the reaction system as a solid product. The piperidine can be regenerated from its hydrochloride by reaction with an alkaline material such as sodium hydroxide or potassium hydroxide, an alkaline carbonate or lime, and simply and effectively recovered as an azeotrope with water, in a concentration of about 65% of the piperidine, a condition in which it can be recycled to the reaction system.

The yields of potassium bicarbonate obtained by this process are at least equal to, and in many cases greater than, the yields obtained with the amines, which were employed heretofore. There was no reason to predict that a cyclic imine, piperidine, would function in the present process for producing potassium bicarbonate, particularly that it would function in the process to provide the significant advantage of relative temperature independence.

The improved method according to the present invention, comprises reacting piperidine with carbon dioxide in an aqueous system containing potassium chloride. The piperidine is converted by the carbon dioxide and water into the water-soluble piperidine bicarbonate, and this intermediate product reacts with potassium chloride to form potassium bicarbonate. The reaction proceeds according to the following over-all equation:

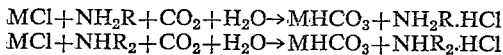
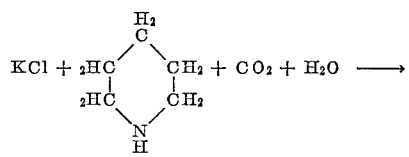

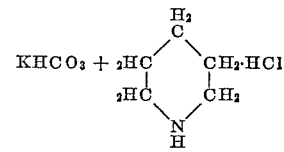

The potassium bicarbonate precipitates as a solid which can readily be separated from the mother liquor by filtration, centrifugation, or other suitable means.

In carrying out the preferred embodiment of this process, carbon dioxide gas is passed into an aqueous system containing potassium chloride and piperidine. The carbon dioxide is passed into the solution at a pressure as low as about 1 atmosphere, although if desired, higher pressures may be employed. At the beginning of the reaction, a solid phase of potassium chloride exists, in contact with a water-soluble piperidine. The reaction mixture is stirred, and the carbon dioxide gas is absorbed.

The reaction mixture is capable of having as many as three solid phases present at the same time, namely, solid potassium chloride, potassium bicarbonate and solid piperidine bicarbonate. Generally stated, the conditions which will give high yields of solid potassium bicarbonate with minimum contamination by other solids are those for which the theoretical absorption of $CO_2$ is highest, where the solubility of the potassium bicarbonate is suppressed by excess bicarbonate ion concentration, and where as little solid potassium chloride and solid piperidine bicarbonate as possible are present in the reaction mitxure.

While the presence of solid potassium chloride in the reaction mixture does not detrimentally affect the product yield, it does lead to contamination of the desired potassium bicarbonate product, and, therefore, should be avoided. The contamination results from the solid potassium chloride being separated along with the solid potassium bicarbonate from the mother liquor.

The reaction is preferably carried out at a temperature of about 10° to 50° C. Excellent yields will be obtained at these temperatures in systems in which the concentrations of piperidine ranges from about 6.0 to 11.5 gram moles per 1,000 grams of water, and the piperidine potassium chloride molar ratio ranges from about 1:1 to 1.4:1. Temperatures lower than about 10° C. may be employed; however, as the temperature decreases below this point, precipitation of the piperidine salt occurs, and the product becomes contaminated. Furthermore, cooling to these lower temperatures is difficult with this exothermic reaction. Higher temperatures, that is above about 50° C., can be employed if desired, but the yield decreases at such high temperatures even with the present piperidine reagent.

As regards amounts of ingredients, reaction systems having piperidine to potassium chloride molar ratios below about 1:1 result in contamination of the product by KCl, and are not recommended for high efficiency or purity. Use of more than about 1.4 moles of piperidine per mole of potassium chloride, on the other hand, is wasteful of piperidine, conferring no additional advantage. Likewise, the use of less than about 6 gram moles of piperidine per 1,000 grams of water in the system, lowers the bicarbonate yield, while use of more than about 11.5 gram moles of piperidine per 1,000 grams of water confers no incremental advantage in the process, and is wasteful of piperidine.

The present process is highly efficient in the production of potassium bicarbonate, providing high yields of this product under extremely simple operating conditions. For example, whereas the previously preferred primary and secondary amines, for example isopropyl amine, operate efficiently at low temperatures, when the temperature is raised to 40° C. or thereabouts with these prior reagents, the yield drops significantly. On the other hand, when piperidine is employed in this reaction, it is possible to operate the process at from about 10 to 50° C. with high efficiency, a result which makes it possible to operate under conditions often encountered in commercial practice, without need for excessive cooling equipment. The process also is useful in that the piperidine hydrochloride present in the reaction liquor after the removal of the potassium chloride product can be regenerated to the piperidine readily by treatment with alkaline materials, and thereafter distillation provides an azeotropic solution of about 65% of piperidine in water, a concentration at which aqueous piperidine can, with modification, be recycled to the reaction liquor.

The following examples are given by way of illustration, of the present process only, and are not to be construed as limiting the scope of the invention in any way.

*Example 1*

Seventy grams of potassium chloride was brought into contact with an aqueous solution of 112 grams of piperidine in 120 grams of water. The mixture was stirred, and a stream of carbon dioxide was passed into it at a temperature maintained at about 20° C., until it was no longer dissolved. Solid potassium bicarbonate precipitated; the precipitate contained 90 grams of potassium bicarbonate, a 96% yield.

The reaction mixture remaining after separation of the bicarbonate product was an aqeuous phase containing piperidine hydrochloride. This solution was treated for removal of the piperidine by addition of a stoichiometric amount of sodium hydroxide to convert the hydrochloride to the piperidine and sodium chloride. The solution was then distilled to provide an azeotropic fraction containing about 65% of piperidine.

*Example 2*

The procedure of Example 1 was followed, with the exception that the temperature employed was 40° C. The potassium bicarbonate product was obtained in the amount of about 86 grams, a yield of 90%.

*Example 3*

By way of comparison with the above, isopropyl amine was employed in the reaction in the amount of about 59 grams along with 52 grams of potassium chloride in 100 grams of water. This amount of amine provides a high yield for the isopropyl amine system. When the reaction was under 20° C., a 95% yield of potassium bicarbonate was obtained. When the reaction was 40° C., a yield of only about 80% of potassium bicarbonate was obtained.

It will be seen from these examples that the piperidine system is highly efficient, providing commercially acceptable yields of potassium bicarbonate at elevated temperatures as well as at 20° C., whereas the isopropyl amine system of the prior art is efficient only at the lower temperature, 20° C.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process for the production of potassium bicarbonate comprising reacting carbon dioxide gas with an aqueous system containing potassium chloride and piperidine to provide potassium bicarbonate and piperidine hydrochloride, and separating the potassium bicarbonate from the reaction mixture.

2. Process for the production of potassium bicarbonate comprising reacting carbon dioxide gas with an aqueous system containing potassium chloride and piperidine to provide potassium bicarbonate and piperidine hydrochloride, separating the potassium bicarbonate from the reaction mixture, regenerating piperidine from its hydrochloride, and separating an azeotropic solution of piperidine from the remaining reaction mixture by distillation.

References Cited in the file of this patent

UNITED STATES PATENTS

| | | |
|---|---|---|
| 2,752,222 | Birman | June 26, 1956 |
| 2,782,093 | Hulot | Feb. 19, 1957 |